F. A. NELSON.
MUSIC INDICATOR.
APPLICATION FILED AUG. 19, 1914.
1,240,083.
Patented Sept. 11, 1917.
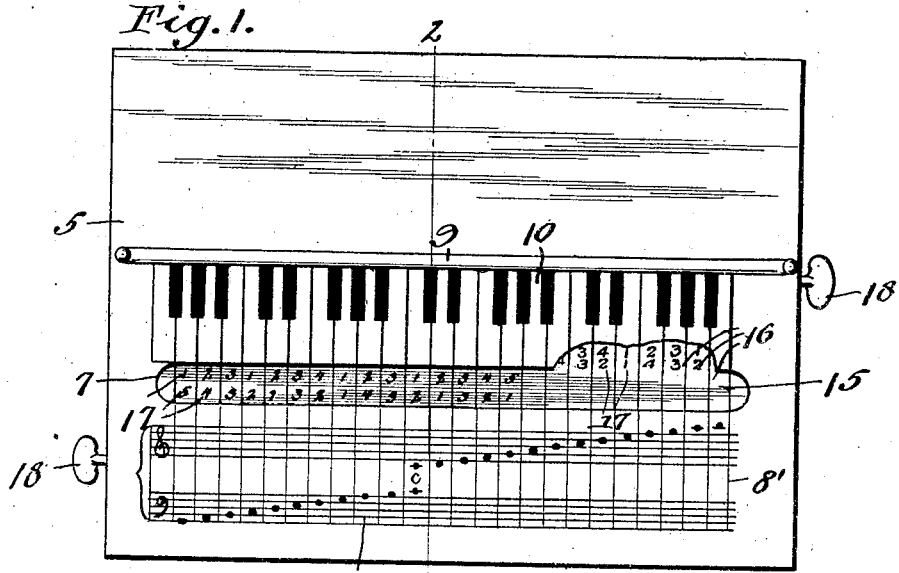
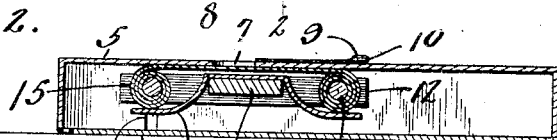
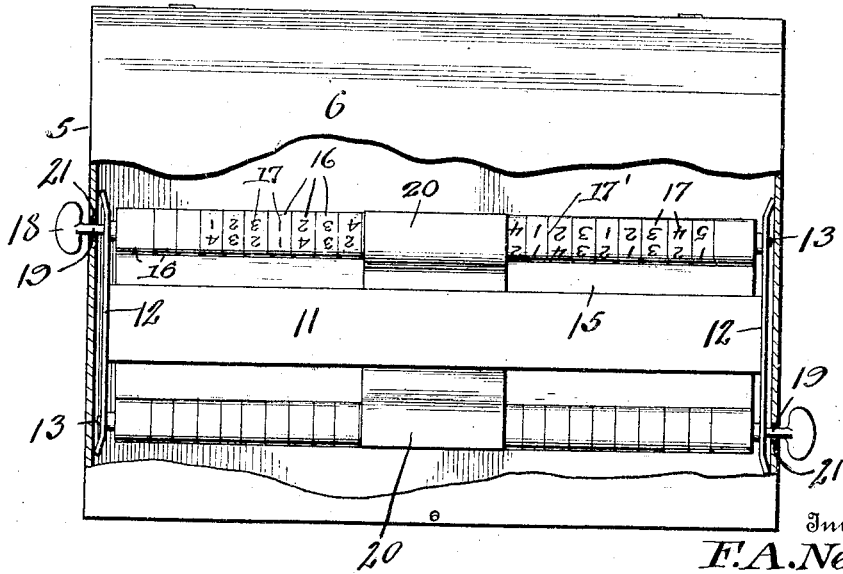
Witnesses
Inventor
F. A. Nelson,
By Victor J. Evans
Attorney

UNITED STATES PATENT OFFICE.

FRANS A. NELSON, OF CHICAGO, ILLINOIS.

MUSIC-INDICATOR.

1,240,083.      Specification of Letters Patent.      Patented Sept. 11, 1917.

Application filed August 19, 1914. Serial No. 857,585.

*To all whom it may concern:*

Be it known that I, FRANS A. NELSON, a citizen of the United States, residing at Chicago, in the county of Cook and State of Illinois, have invented new and useful Improvements in Music-Indicators, of which the following is a specification.

The invention relates to musical indicator charts.

The primary object of the invention is the provision of a fingering indicator whereby a person can easily and quickly learn to play the major and minor scales, chords and arpeggios without confusion which may result from seeing them grouped together on a printed page of music.

A further object of the invention is the provision of a fingering indicator which is readily adjustable to different musical passages, for the purpose of indicating the particular key to be struck in order to produce a certain note, and to indicate the finger to be used in striking the key.

Another object of the invention is the provision of a fingering indicator of this character which is simple in construction, compact in form, reliable and efficient in its purpose, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing:—

Figure 1 is a top plan view of a fingering indicator constructed in accordance with the invention.

Fig. 2 is a vertical transverse sectional view on the line 2—2 of Fig. 1.

Fig. 3 is a view similar to Fig. 1, looking toward the rear side of the case of the indicator, the said rear side being broken away.

Similar reference characters indicate corresponding parts throughout the several views in the drawing.

Referring to the drawing in detail, the fingering indicator comprises a shallow box-like casing 5, preferably made from papier-mâché, although it may be made from any other material found desirable, and has a hinged side 6 which serves as a door to permit access to the interior of the casing, the said hinged side being preferably at the rear of the latter, while the front side of the casing is formed with an elongated slot 7 which extends substantially the length of the casing to make visible a portion of a chart, which, together with the mechanism for operating the same, is hereinafter fully described.

At one side of the slot 7 and upon the front of the casing 5 is a series of printed notes 8, showing the scale of C. This scale may be attached to the casing in any desired manner, or it may be simply laid thereon in such position that the vertical lines will register with those above in a manner to be later described. At the opposite side of the slot is a chart 9, the said chart being intended to indicate the white and black keys 10 of the key board of a piano or organ, so that the indicator will coöperate therewith to enable a person to determine which of the keys of the piano or organ should be struck in the playing of different scales, arpeggios or chords.

The indicator mechanism comprises a frame including a central bar 11 carrying at opposite ends resilient cross strips 12 in which are journaled the journal ends 13 of a pair of spaced parallel rollers 14 on which is adapted to be alternately wound and unwound an indicator strip or sheet 15 forming the chart, the ends thereof being fastened to the rollers 14 in any suitable manner. It will be noted that the opposite extremities of each of the cross strips 12 are bent outwardly as at 12', and are adapted to engage the end walls of the casing whereby the central bar will be held in close proximity to the upper wall of the casing, and in proper position with relation to the slot.

The sheet or strip 15 is provided with a double series of numbers ranging from 1 to 5 indicated at 16, said numbers being arranged as at 17, and extending transversely of the sheet. In Fig. 1 of the drawing the scale C and the numerals indicating the fingers of the hand to be used in the striking of the keys to produce the notes of this scale are shown, the upper row of figures designating the fingers of the right hand and the numbers in the lower row designating the fingers of the left hand. The figures are so arranged with respect to the keyboard located adjacent the slot as to indicate which key is to be struck.

The sheet 15 is adjustable by means of thumb screws or heads 18 which have their shanks 19 connected to the journal ends of the rollers 14 so that the sheet may be readily moved for changing the combination of numerals visible through the slot 7, as may be desired.

Mounted upon the central bar 10 of the frame is a metal strip 20, the free ends of which engage the strip or sheet 15 wound upon the rollers 14, and serve to exert a slight pressure thereon to prevent the stretches of the sheet or strip from becoming slack, or being loosely wound upon the roller during its adjustment by the finger piece 18. The ends of the casing 5 are provided with suitable notches 21 adapted to receive shanks 19 of the finger pieces 18 which are secured within the ends of the rollers 14. This arrangement permits the ready removal of the indicator mechanism from the casing.

The musical passage 8 has each of its ends contained within a separate division, these divisions being formed by the lines 8', while the numerals 17 are divided longitudinally of the strip 15 by the line 17'. The lines 8' and 17' register with one another and with the keys 10, so as to form registering divisions on the face of the indicator the note in each of these divisions being produced by striking the respective key with the finger indicated in its particular division.

From the foregoing it is thought that the construction and manner of operation of the device will be clearly understood, and therefore a more extended explanation has been omitted.

What is claimed is:

1. A fingering indicator comprising a casing having a slot in one side, a representation of a key board upon said casing at one side of the slot, a representation of a musical passage on the opposite side of said slot, a fingering-indicating sheet within said casing, and traversable across said slot for coöperation with said key board and musical passage, said key board, musical passage and indications upon said sheet being alined to indicate the finger used in striking each note and means for adjusting the said indicator sheet to indicate the fingering of the given passage.

2. A fingering indicator comprising a casing having a slot at one side, the representation of a key board upon said casing at one side of the slot, a representation of a musical passage upon the opposite side of the said slot and alined with said keyboard representation and means visible through the slot for indicating the finger to be used in striking a particular key.

In testimony whereof I affix my signature in presence of two witnesses.

FRANS A. NELSON.

Witnesses:
OTTO L. TERSCH,
ERNST A. STRASSBURGER.

Copies of this patent may be obtained for five cents each, by addressing the "Commissioner of Patents Washington, D. C."